(12) United States Patent
Thøgersen et al.

(10) Patent No.: US 8,538,585 B2
(45) Date of Patent: Sep. 17, 2013

(54) CONTROL OF PULL-DOWN IN REFRIGERATION SYSTEMS

(75) Inventors: Ole Thøgersen, Nyborg (DK); Allan Dyrmose, Bogense (DK); Dan Vad Steffensen, Spentrup (DK)

(73) Assignees: Thermo King Corporation, Minneapolis, MN (US); Johnson Controls Technology Company, Plymouth, MI (US)

( * ) Notice: Subject to any disclaimer, the term of this patent is extended or adjusted under 35 U.S.C. 154(b) by 805 days.

(21) Appl. No.: 12/604,051

(22) Filed: Oct. 22, 2009

(65) Prior Publication Data
US 2010/0106303 A1 Apr. 29, 2010

Related U.S. Application Data

(60) Provisional application No. 61/108,088, filed on Oct. 24, 2008.

(51) Int. Cl.
*G05D 23/00* (2006.01)
*F24F 11/06* (2006.01)

(52) U.S. Cl.
USPC ............................ 700/275; 165/247

(58) Field of Classification Search
USPC ............... 700/275, 276, 281, 282; 454/77, 454/79, 88, 90–92, 118; 62/115, 440, 498; 165/244–247, 253, 260, 266, 287; 236/35
See application file for complete search history.

(56) References Cited

U.S. PATENT DOCUMENTS

| 4,137,057 A | 1/1979 | Piet et al. |
| 4,663,725 A | 5/1987 | Truckenbrod et al. |
| 4,787,214 A | 11/1988 | Stillwell |
| 4,790,143 A | 12/1988 | Hanson |

(Continued)

FOREIGN PATENT DOCUMENTS

| JP | 06050647 | 2/1994 |
| JP | 2003097858 | 4/2003 |

(Continued)

OTHER PUBLICATIONS

Holder, Roger D., "Characteristics of Evaporators," Oct. 28, 2003. <<http://www.refrigtech.com/Knowledge_Center/Knowledge_Characteristics_Evaporators.pdf>>.*

(Continued)

*Primary Examiner* — M. N. Von Buhr
(74) *Attorney, Agent, or Firm* — Michael Best & Friedrich LLP

(57) ABSTRACT

A method for operating a refrigeration system for a container to pull down the temperature of cargo from ambient to a predetermined set-point temperature, and a system employing the method. The method includes operating a compressor at a first power to compress a refrigerant and direct the refrigerant through a condenser and an evaporator of the refrigeration system, initially operating an evaporator fan at a first speed to supply refrigerated supply air from the evaporator to the cargo within the container, sensing the temperature of the supply air, comparing the temperature of the supply air with a predetermined set-point temperature, and increasing the speed of the evaporator fan to a second speed faster than the first when the temperature of the supply air is lower than the predetermined set-point temperature to maintain the temperature of the supply air at the predetermined set-point temperature.

19 Claims, 3 Drawing Sheets

(56) References Cited

U.S. PATENT DOCUMENTS

| | | | |
|---|---|---|---|
| 4,899,549 A | 2/1990 | Berge et al. | |
| 4,949,550 A | 8/1990 | Hanson | |
| 4,977,752 A | 12/1990 | Hanson | |
| 4,979,431 A | 12/1990 | Fujimoto et al. | |
| 5,123,251 A | 6/1992 | Hanson | |
| 5,123,252 A | 6/1992 | Hanson | |
| 5,123,253 A | 6/1992 | Hanson et al. | |
| 5,140,825 A | 8/1992 | Hanson et al. | |
| 5,140,826 A | 8/1992 | Hanson et al. | |
| 5,161,383 A | 11/1992 | Hanson et al. | |
| 5,161,384 A | 11/1992 | Hanson et al. | |
| 5,168,713 A | 12/1992 | Howland | |
| 5,172,560 A * | 12/1992 | Jurewicz et al. | 62/89 |
| 5,181,389 A | 1/1993 | Hanson et al. | |
| 5,186,015 A | 2/1993 | Roehrich et al. | |
| 5,197,670 A | 3/1993 | Hanson et al. | |
| 5,201,185 A | 4/1993 | Hanson et al. | |
| 5,201,186 A | 4/1993 | Hanson | |
| 5,222,368 A | 6/1993 | Hanson | |
| 5,228,301 A | 7/1993 | Sjoholm et al. | |
| 5,249,429 A | 10/1993 | Hanson | |
| 5,295,364 A | 3/1994 | Truckenbrod et al. | |
| 5,303,560 A | 4/1994 | Hanson et al. | |
| 5,375,428 A * | 12/1994 | LeClear et al. | 62/187 |
| 5,396,779 A * | 3/1995 | Voss | 62/196.2 |
| 5,456,088 A | 10/1995 | Hanson et al. | |
| 5,557,938 A | 9/1996 | Hanson et al. | |
| 5,557,941 A | 9/1996 | Hanson et al. | |
| 5,572,879 A | 11/1996 | Harrington et al. | |
| 5,579,648 A | 12/1996 | Hanson et al. | |
| 5,596,878 A | 1/1997 | Hanson et al. | |
| 5,634,347 A | 6/1997 | Hanson et al. | |
| 6,095,427 A | 8/2000 | Hoium et al. | |
| 6,112,535 A * | 9/2000 | Hollenbeck | 62/228.4 |
| 6,560,980 B2 * | 5/2003 | Gustafson et al. | 62/186 |
| 6,619,061 B2 * | 9/2003 | Beaverson et al. | 62/201 |
| 6,679,074 B2 | 1/2004 | Hanson | |
| 6,691,524 B2 * | 2/2004 | Brooke | 62/180 |
| 6,708,510 B2 | 3/2004 | Sulc et al. | |
| 6,779,353 B2 * | 8/2004 | Hu et al. | 62/180 |
| 6,829,523 B2 | 12/2004 | Hanson | |
| 6,862,499 B1 | 3/2005 | Cretella et al. | |
| 6,895,764 B2 | 5/2005 | Viegas et al. | |
| 6,910,341 B2 | 6/2005 | Srichai et al. | |
| 7,080,521 B2 | 7/2006 | Ludwig et al. | |
| 7,260,946 B2 | 8/2007 | Ludwig et al. | |
| 7,266,961 B2 | 9/2007 | Ludwig et al. | |
| 7,765,818 B2 * | 8/2010 | Buck | 62/180 |
| 2003/0182952 A1 | 10/2003 | Brooke | |
| 2006/0130504 A1 * | 6/2006 | Agrawal et al. | 62/228.4 |
| 2008/0245085 A1 * | 10/2008 | Jaffer | 62/228.1 |
| 2011/0048042 A1 * | 3/2011 | Chen et al. | 62/115 |
| 2011/0265507 A1 * | 11/2011 | Zangari et al. | 62/255 |

FOREIGN PATENT DOCUMENTS

| | | |
|---|---|---|
| JP | 2008096028 | 4/2008 |
| KR | 20070051530 | 5/2007 |
| WO | WO 2007135815 A1 * | 11/2007 |

OTHER PUBLICATIONS

Granryd, E., "Power for Fans and Pumps in Heat Exchangers of Refrigerating Plants" (1998). International Refrigeration and Air Conditioning Conference. Paper 410. <<http://docs.lib.purdue.edu/irac/410>>.*

Martin et al., "Configuration Types and Sequence of Operations for the InfraStruXure InRow SC," American Power Conversion, 2007. <<http://www.apcmedia.com/salestools/DRON-6X6VG3_R0_EN.pdf>>.*

Hoffman, P., Ag Power Web Enhanced Course Materials, "Air Conditioning—Evaporator," 2006. <<http://www.swtc.edu/Ag_Power/air_conditioning/lecture/evaporator.htm>>.*

Extended Search Report from the European Patent Office for Application No. 09252463.6 dated Dec. 6, 2011 (12 pages).

* cited by examiner

CONTROL OF PULL-DOWN IN REFRIGERATION SYSTEMS

CROSS REFERENCE TO RELATED APPLICATIONS

This application claims the priority of U.S. Provisional Patent Application No. 61/108,088, filed Oct. 24, 2008, the contents of which are hereby incorporated by reference herein.

FIELD OF THE INVENTION

This invention relates to climate control in cargo containers and to devices for controlling the climate in cargo containers. In particular the invention relates to refrigeration systems for use in cargo containers and methods for operating such systems.

BACKGROUND OF THE INVENTION

The present invention relates to transporting and storing temperature sensitive cargo over long periods of time using a controlled climate in the space where the cargo is loaded. Climate control includes controlling the temperature of the cargo within a certain acceptable range. Controlling the temperature includes bringing the temperature of the cargo into the acceptable range (by refrigerating or heating) and maintaining the temperature within that range. Climate control may also include controlling other parameters such as humidity and composition of the atmosphere.

Refrigeration is the process of removing heat from an enclosed space, or from a substance, and moving it to a place where it is unobjectionable. The primary purpose of refrigeration is lowering the temperature of the enclosed space or substance and then maintaining that lower temperature.

One commonly used refrigeration technique is the vapor-compression cycle. The vapor-compression cycle is used in most household refrigerators as well as in many large commercial and industrial refrigeration systems.

A refrigerated container or reefer is a shipping container used in intermodal freight transport, including rail, ship and truck, where the cargo is refrigerated (chilled or frozen) for the transportation of temperature sensitive cargo. A reefer will usually have an integral refrigeration unit.

The reliability of the refrigeration unit is of paramount importance. The temperature of temperature sensitive cargo should be kept within predefined limits. Some cargo must be maintained frozen, and the temperature of any part of the frozen cargo must be kept below a predefined freezing temperature which depends on the cargo, e.g. below −18 degrees C. or lower, while other cargo and commodities such as fresh fruit and vegetables should be kept chilled to stay fresh, but not frozen. For chilled fruit and vegetables there is a lowest acceptable temperature below which the commodity will begin degrading and loose its freshness. Such temperature is dependent upon the type of commodity.

Refrigerated containers have a refrigeration system and one or more evaporator fans for extracting return air from the container. The extracted return air is blown past the evaporator to refrigerate the air, and the refrigerated supply air is blown as into the container where it circulates and exchanges heat with the cargo and/or with the walls of the container before returning to the evaporator.

When a cargo has been loaded into a refrigerated container at ambient temperature, the cargo must be refrigerated to obtain a target temperature, also referred to as the set-point temperature. The process of bringing the temperature of the cargo down to the set-point temperature is usually referred to as pull-down.

Traditionally, in pull-down mode the compressor operates at or near its full capacity, and the evaporator fan is operated at high speed to circulate refrigerated supply air in the container, in order to achieve the maximum refrigeration effect and to have the cargo refrigerated in a short time.

The energy required for circulating the air in the container is ultimately dissipated as heat in the container due to friction. Depending on whether the evaporator fan is operated in low speed mode or in high speed mode it delivers from a few hundred watts or up to a few kilowatts (kW) which is dissipated as heat in the container. This energy adds to the energy that enters the container from the ambient and the heat that is generated by the cargo itself, all of which must be removed by the refrigeration system. Assuming idealized and optimistic efficiencies of 100% of both the evaporator fan and the compressor, for each kW consumed by the evaporator fan another kW will be consumed by the compressor to remove the friction energy from the container and its cargo.

It is an object of the invention to save energy during pull-down and to have a short pull-down period.

SUMMARY OF THE INVENTION

It follows from the above considerations that, assuming constant compressor power, e.g. maximum, a change from operating the evaporator fan at high speed to operating at low speed, will have at least the following effects:
- the power consumed by the evaporator fan will be reduced,
- the power dissipated in the container by the circulated air will be reduced by the same amount,
- the power available for refrigerating the cargo will increase by the same amount,
- due to the reduced air flow the temperature difference ΔT between the air returning from the container and the air supplied to the container from the refrigeration system will increase, i.e. the supply air will have a lower temperature.

An object of the invention is to reduce the energy consumed by the refrigeration system without degrading the performance of the system. According to the invention the above considerations are utilized in a phase of pull-down whereby a considerable amount of energy is saved and a faster pull-down of the cargo is also achieved.

In one embodiment, the invention is directed to a method for operating a refrigeration system for a container to pull down the temperature of cargo from ambient to a predetermined set-point temperature. The method includes operating a compressor at a first power to compress a refrigerant and direct the refrigerant through a condenser and an evaporator of the refrigeration system, and operating an evaporator fan at a first speed to supply refrigerated supply air from the evaporator to the cargo within the container. The method also includes sensing the temperature of the supply air, comparing the temperature of the supply air with a predetermined set-point temperature, and increasing the speed of the evaporator fan to a second speed faster than the first when the temperature of the supply air is lower than the predetermined set-point temperature to maintain the temperature of the supply air at the predetermined set-point temperature.

Another embodiment of the invention includes a refrigeration system for a container to pull down the temperature of cargo from ambient to a predetermined set-point temperature. The system includes a compressor configured to operate at a first power to compress a refrigerant and direct the refrigerant through a condenser and an evaporator, and an evaporator fan configured to initially operate at a first speed to supply refrigerated supply air from the evaporator to the cargo within the container when the cargo is at ambient temperature. The system also includes a sensor configured to sense the temperature of the supply air, and a controller programmed to compare the temperature of the supply air with the predetermined set-point temperature, where the controller increases the speed of the evaporator fan to a second speed faster than the first speed when the temperature of the supply air is lower than the predetermined set-point temperature to maintain the temperature of the supply air at the predetermined set-point temperature.

Other aspects of the invention will become apparent by consideration of the detailed description and accompanying drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
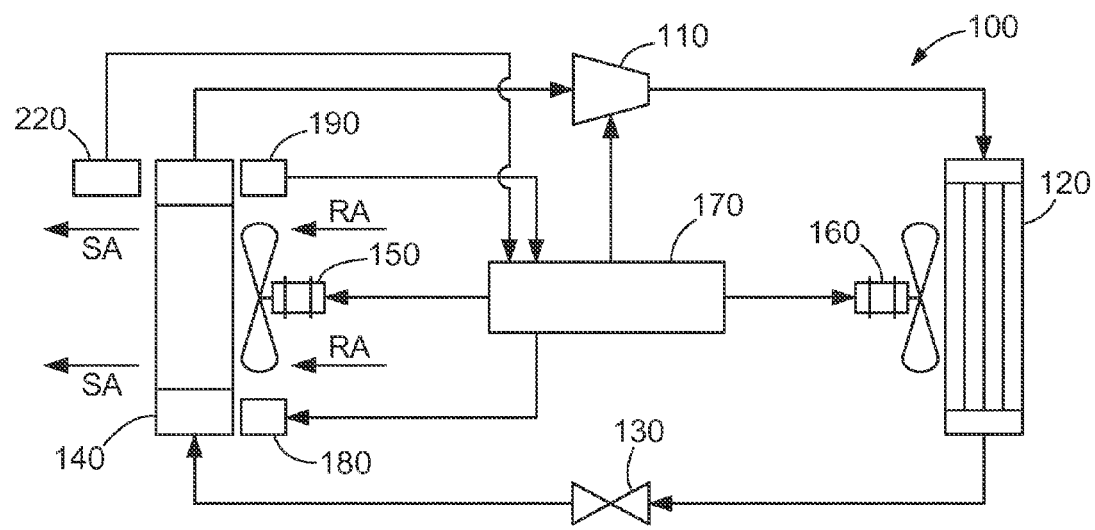
FIG. 1 shows schematically a refrigeration system according to the invention.

FIG. 1 is a simplified diagram of the basic components of a typical one-stage vapor-compression refrigeration system 100 according to the invention. In this cycle, a circulating refrigerant enters the compressor 110 as a vapor. In the compressor the vapor is compressed and exits the compressor superheated. The superheated vapor travels through the condenser 120 which first cools and removes the superheat and then condenses the vapor into a liquid by removing additional heat at constant pressure and temperature. The liquid refrigerant goes through an expansion valve 130 (also called a throttle valve) where its pressure abruptly decreases, causing flash evaporation and auto-refrigeration of, typically, less than half of the liquid. That results in a mixture of liquid and vapor at a lower temperature and pressure. The cold liquid-vapor mixture then travels through the evaporator 140 coil or tubes and is completely vaporized by cooling the warm return air RA returning from the refrigerated space being blown by an evaporator fan 150 across the evaporator coil or tubes. The cool supply air SA is blown into the refrigerated space. The resulting refrigerant vapor returns to the compressor inlet to complete the thermodynamic cycle. A condenser fan 160 removes condensation heat from the condenser 110. A controller 170 controls the operation of the refrigeration system and its individual components.

Preferably, the evaporator fan motor and the condenser fan motors can both be controlled to any desired motor speed, e.g. by pulse-width modulation (PWM) of the electric power supplied to them.

During operation water vapor will condensate on the evaporator 140 and form a layer of ice which will degrade the efficiency of the evaporator. The ice is removed in defrosting cycles where the compressor 110 and the evaporator fan 150 are inactivated, and a heater 180 is activated which will heat the evaporator 140. A temperature sensor 190 senses the temperature of the evaporator 140 and when it has been determined, based on the sensed evaporator temperature, that the ice is melted, the compressor 110 is again activated. When the temperature of the evaporator is sufficiently low the evaporator fan 150 is activated and the refrigeration system is in operation again. A temperature sensor 220 senses the temperature of the supply air SA discharged from the evaporator 140.

The refrigeration system 100 can have one or more evaporator fans 150. The power of the evaporator fan motors can be controlled in two or more steps or continuously by the controller 170.

Figure 2:
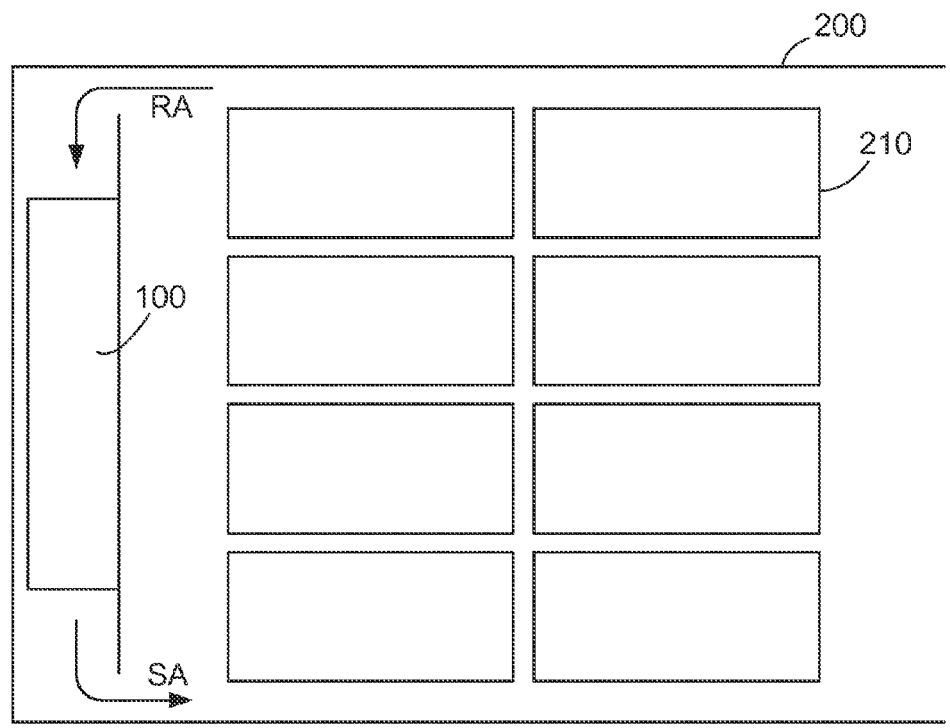
FIG. 2 shows a refrigerated container with the refrigeration system in FIG. 1 installed.

FIG. 2 shows schematically a portion of a refrigerated container 200 loaded with cargo 210 to be refrigerated. The container 200 has a refrigeration system 100 installed in one end, and the container has doors (not shown) in the opposite end for loading and unloading the cargo 210. The evaporator fan or fans 150 of the refrigeration system 100 blow refrigerated supply air SA into the container where it circulates around the cargo 210 and returns as return air RA to the refrigeration system 100.

Figure 3:
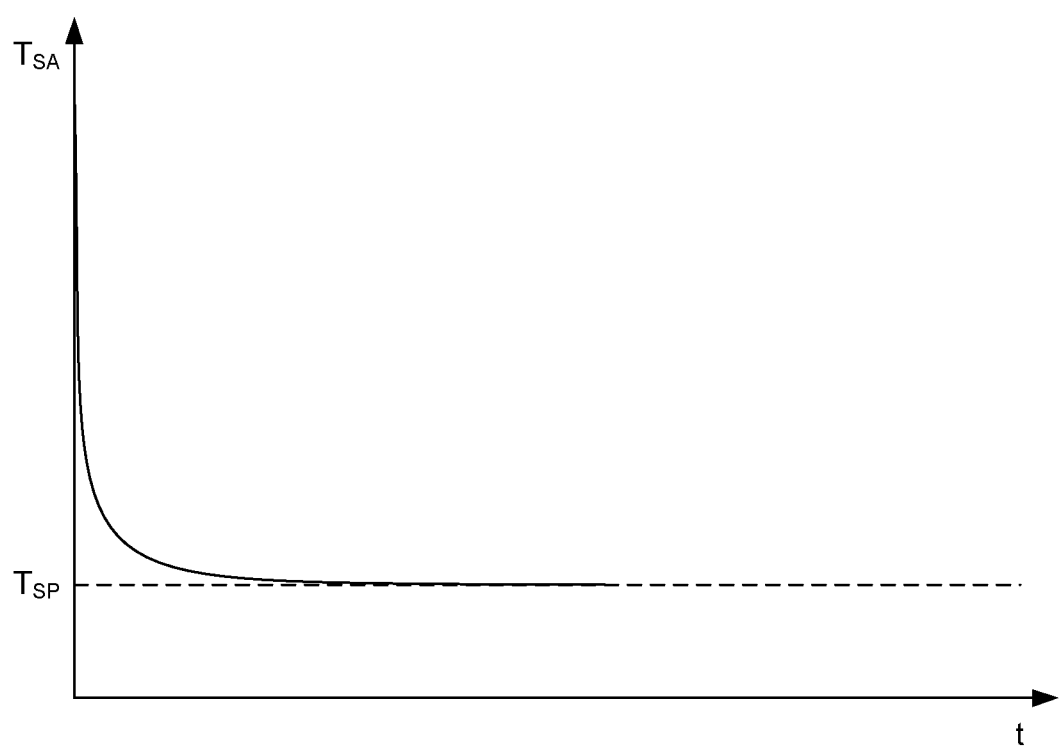
FIG. 3 shows the temperature $T_{SA}$ of the supply air as a function of time t after refrigeration is initiated.

FIG. 3 shows schematically the temperature $T_{SA}$ of the supply air delivered from the refrigeration system into the container as a function of time t.

According to the invention the temperature $T_{SA}$ of the supply air SA is kept constant at a value not lower than the set-point temperature $T_{SP}$, and preferably at the set-point temperature $T_{SP}$, through the entire pull-down period. When the compressor operates at constant power, e.g. full power, the temperature difference between the return air RA and the supply air SA depends on the air flow through the evaporator coil. A high air flow will result in a small temperature difference, whereas a low air flow will result in a larger temperature difference. The temperature $T_{RA}$ of the return air RA is substantially independent on the air flow speed, and a change in the air flow speed will therefore result in a corresponding change in the temperature $T_{SA}$ of the supply air SA. The invention makes use of this fact.

Figure 4:
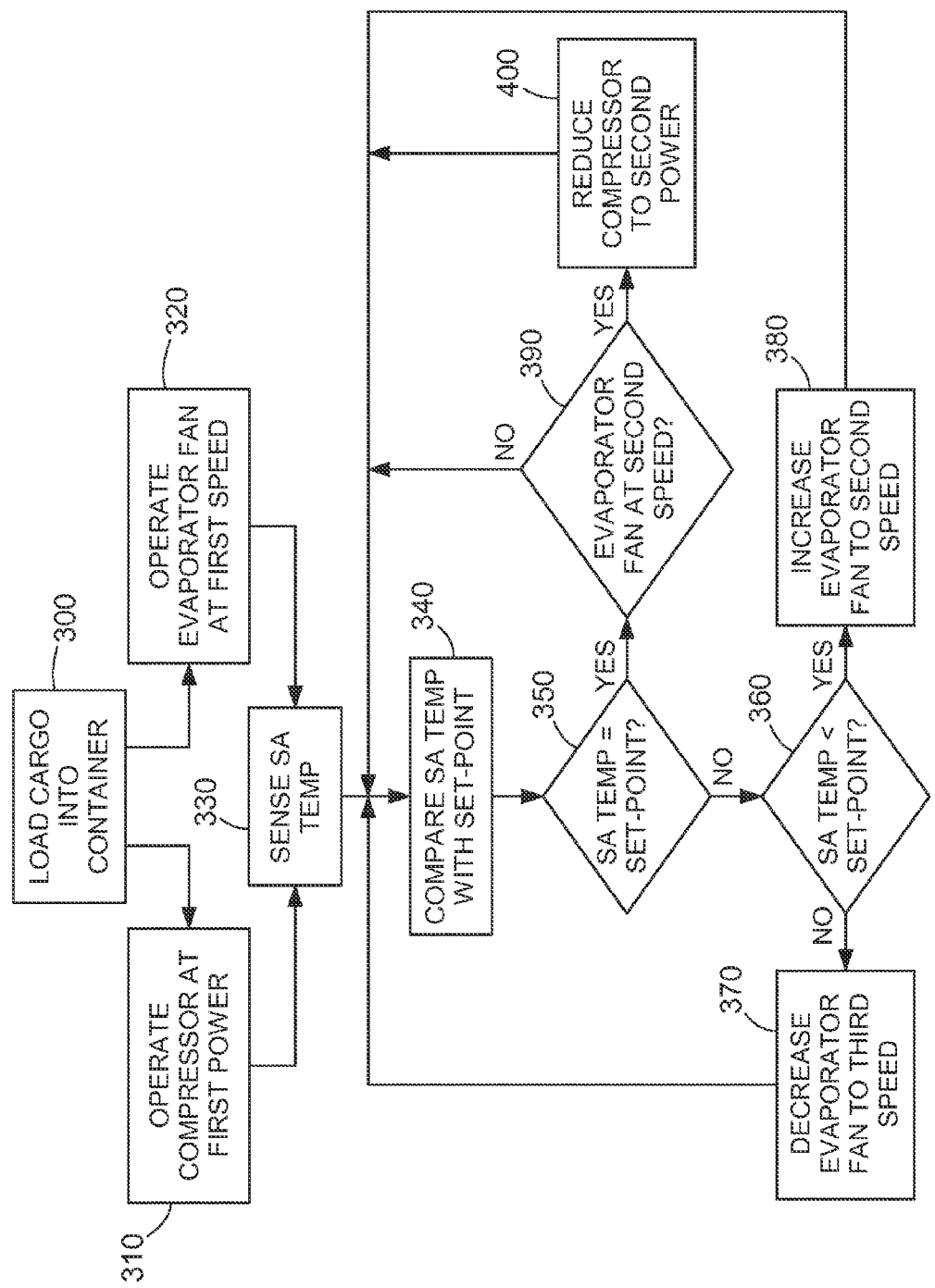
FIG. 4 shows a flowchart illustrating a method of operating the refrigeration system of FIG. 1.

Referring also to FIG. 4, when the cargo has been loaded into the container (step 300) and refrigeration is initiated, the compressor 110 is operated at high power (step 310), e.g., at or near its full capacity, and the evaporator fan 150 is operated at reduced, low speed relative to its maximum speed (step 320). The resulting air flow through the evaporator coil and in the container is therefore relatively low resulting in a correspondingly high temperature difference between the return air RA and the supply air SA.

When the temperature $T_{SA}$ of the supply air SA has reached the set-point temperature $T_{SP}$, which is its ideal or target temperature, this temperature of the supply air is maintained by regulating the speed of the evaporator fan 150 motor to adapt the air flow so that the temperature of the supply air is maintained at the set-point temperature $T_{SP}$. Thus, if the temperature $T_{SA}$ of the supply air SA increases above the set-point temperature $T_{SP}$, the controller 170 will reduce the speed of the evaporator fan 150 motor correspondingly to lower the temperature $T_{SA}$ of the supply air SA (steps 330, 340, 350, 360, 370), and if the temperature $T_{SA}$ of the supply air SA falls below the set-point temperature $T_{SP}$, the controller 170 will increase the speed of the evaporator fan 150 motor correspondingly to increase the temperature $T_{SA}$ of the supply air SA (steps 330, 340, 350, 360, 380). Thereby the temperature $T_{SA}$ of the supply air SA is kept constant at the set-point temperature $T_{SP}$ as desired.

As the cargo is refrigerated and the temperature $T_{RA}$ of the return air RA is correspondingly lowered, the evaporator fan motor will be operated at increasing speed, since the difference between the return air temperature and the supply air temperature will have to be reduced in order to prevent the supply air temperature to become lower than the set-point temperature. The pull-down period ends when it is necessary to operate the evaporator fan motor at full speed in order to maintain the supply air temperature at a temperature not lower than the set-point temperature.

The evaporator fan motor or motors are preferably capable of being operated at any desired speed, but they may also be traditional two-speed motors, i.e. high speed and low speed, and the controller 170 may be capable of controlling the speed of the fan motors in a plurality of discrete steps or at continuously variable speed.

If the evaporator fan motors are traditional two-speed motors, i.e. high speed and low speed, the evaporator fan motor is first operated in low speed mode while the compressor is operated at high power until the supply air temperature $T_{SA}$ is reduced to the set-point temperature $T_{SP}$. From this point the evaporator fan motor is operated in high speed mode which results in a corresponding rise of the supply air temperature $T_{SA}$, and the evaporator fan motor and the compressor are both operated at high power/high speed. This mode of operation continues until the supply air temperature $T_{SA}$ is again reduced to the set-point temperature $T_{SP}$, and the pull-down phase is ended.

If the evaporator fan motors are operated e.g. at 1 kW below high speed power, then 1 kW more power is immediately available for refrigerating the cargo and 2 kW less power is consumed. Furthermore, since the air flow through the evaporator is reduced the supply air temperature $T_{SA}$ is lower than it would have been had the evaporator fan motors been operated at a higher speed.

Another consequence of the reduced speed of the evaporator fan motors 150 is that the refrigerated supply air SA may not fully reach the far end of the container but mainly the near end close to the refrigeration system and the inlet for supply air SA, but the cargo at the near end of the container will be refrigerated faster than if the evaporator fans had been operated at high speed.

The pull-down process ends when the supply air temperature $T_{SA}$ reaches the set-point temperature $T_{SP}$, and full compressor power is no longer needed. It will now be necessary to reduce the compressor power in order to avoid that the supply air temperature $T_{SA}$ drops below the set-point temperature $T_{SP}$. Specifically, the compressor power is reduced when the supply air temperature equals the predetermined set-point temperature and the evaporator fan is at an increased speed. The compressor power can be reduced (see FIG. 4, steps 350, 390, 400), e.g., by modulating the compressor between loaded and unloaded states, and the compressor and the evaporator fan will be operated in a mode for maintaining the cargo at the desired constant set-point temperature $T_{SP}$. The next phase is thus a maintenance phase where the low temperature of the cargo is maintained.

Various features and advantages of the invention are set forth in the following claims.

What is claimed is:

1. A method for operating a refrigeration system for a container to pull down the temperature of cargo from ambient to a predetermined set-point temperature, the method comprising:

operating a compressor of the refrigeration system at a first power to compress a refrigerant and direct the refrigerant through a condenser and an evaporator of the refrigeration system, wherein the compressor, condenser, and evaporator are connected in series;

initially operating an evaporator fan at a first speed to supply refrigerated supply air from the evaporator to the cargo within the container when the cargo is at ambient temperature;

sensing the temperature of the supply air;

comparing the temperature of the supply air with the predetermined set-point temperature;

increasing the speed of the evaporator fan to a second speed faster than the first speed when the temperature of the supply air is lower than the predetermined set-point temperature to maintain the temperature of the supply air at the predetermined set-point temperature; and decreasing the speed of the evaporator fan from the second speed to a third speed slower than the second speed when the temperature of the supply air is higher than the predetermined set-point temperature while the compressor is operating to maintain the temperature of the supply air at the predetermined set-point temperature.

2. The method of claim 1, further comprising operating the compressor at a constant power when the fan operates at the first and second speeds.

3. The method of claim 1, further comprising operating the compressor at a second power lower than the first power when the supply air temperature equals the predetermined set-point temperature and the evaporator fan is at the second speed.

4. The method of claim 3, wherein the first speed is a minimum speed and the second speed is a maximum speed.

5. The method of claim 4, wherein the first power is a maximum power.

6. The method of claim 1, further comprising driving the evaporator fan with a controllable evaporator fan motor.

7. The method of claim 6, further comprising controlling the evaporator fan motor by pulse width modulation (PWM) of the electric power supplied to the evaporator fan motor.

8. The method of claim 6, wherein driving the evaporator fan includes driving the evaporator fan with two-speed evaporator fan motor.

9. The method of claim 1, further comprising directing refrigerated supply air into the cargo container, circulating the air past the cargo, and returning the air as return air through the evaporator.

10. A refrigeration system for a container to pull down the temperature of cargo from ambient to a predetermined set-point temperature, the system comprising:

a compressor configured to operate at a first power to compress a refrigerant and direct the refrigerant through a condenser and an evaporator, wherein the compressor, condenser, and evaporator are connected in series;

an evaporator fan configured to initially operate at a first speed to supply refrigerated supply air from the evaporator to the cargo within the container when the cargo is at ambient temperature;

a sensor configured to sense the temperature of the supply air; and a controller programmed to compare the temperature of the supply air with the predetermined set-point temperature, wherein the controller increases the speed of the evaporator fan to a second speed faster than the first speed when the temperature of the supply air is lower than the predetermined set-point temperature and wherein the controller decreases the speed of the evaporator fan from the second speed to a third speed slower than the second speed when the temperature of the supply air is higher than the predetermined set-point temperature while the compressor is operating to maintain the temperature of the supply air at the predetermined set-point temperature.

11. The system of claim 10, wherein the compressor is configured to operate at a constant power when the fan operates at the first and second speeds.

12. The system of claim 10, wherein the compressor is configured to operate at a second power lower than the first power when the supply air temperature equals the predetermined set-point temperature and the evaporator fan is at the second speed.

13. The system of claim 12, wherein the first speed of the evaporator fan is a minimum speed and the second speed is a maximum speed.

14. The system of claim 13, wherein the first power of the compressor is a maximum power.

15. The system of claim 10, wherein a controllable evaporator fan motor drives the evaporator fan.

16. The system of claim 15, wherein the controller controls the fan motor by supplying pulse-width-modulated electric power to the fan motor.

17. The system of claim 15, wherein the fan motor includes a two-speed evaporator fan motor.

18. The system of claim 10, wherein the evaporator fan is configured to direct refrigerated supply air into the cargo container, circulate the air past the cargo, and draw in the air as return air through the evaporator.

19. A method for operating a refrigeration system for a container to pull down the temperature of cargo from ambient to a predetermined set-point temperature, the method comprising:

operating a compressor of the refrigeration system at a first maximum power to compress a refrigerant and direct the refrigerant through a condenser and an evaporator of the refrigeration system, wherein the compressor, condenser, and evaporator are connected in series;

initially operating an evaporator fan at a first minimum speed to supply refrigerated supply air from the evaporator to the cargo within the container when the cargo is at ambient temperature;

sensing the temperature of the supply air;

comparing the temperature of the supply air with the predetermined set-point temperature;

increasing the speed of the evaporator fan to a second maximum speed faster than the first speed when the temperature of the supply air is lower than the predetermined set-point temperature to maintain the temperature of the supply air at the predetermined set-point temperature;

decreasing the speed of the evaporator fan from the second speed to a third speed slower than the second speed when the temperature of the supply air is higher than the predetermined set-point temperature while the compressor is operating to maintain the temperature of the supply air at the predetermined set-point temperature;

operating the compressor at a constant power when the fan operates at the first and second speeds;

operating the compressor at a second power lower than the first power when the supply air temperature equals the predetermined set-point temperature and the evaporator fan is at the second speed; and directing the refrigerated supply air into the cargo container, circulating the air past the cargo, and returning the air as return air through the evaporator.

* * * * *